US009175978B2

(12) United States Patent
Hall

(10) Patent No.: US 9,175,978 B2
(45) Date of Patent: Nov. 3, 2015

(54) AIRCRAFT DISPLAYS AND DISPLAY ARRANGEMENTS

(75) Inventor: Andrew Hall, Cheltenham (GB)

(73) Assignee: GE Aviation Systems Limited, Cheltenham (GB)

( * ) Notice: Subject to any disclaimer, the term of this patent is extended or adjusted under 35 U.S.C. 154(b) by 864 days.

(21) Appl. No.: 12/593,951

(22) PCT Filed: Mar. 27, 2008

(86) PCT No.: PCT/GB2008/001070
§ 371 (c)(1),
(2), (4) Date: Dec. 8, 2009

(87) PCT Pub. No.: WO2008/119955
PCT Pub. Date: Oct. 9, 2008

(65) Prior Publication Data
US 2010/0090868 A1    Apr. 15, 2010

(30) Foreign Application Priority Data

Mar. 30, 2007    (GB) .................................. 0706210.2

(51) Int. Cl.
*G01C 21/00*    (2006.01)
*G01C 23/00*    (2006.01)
*B64D 43/00*    (2006.01)

(52) U.S. Cl.
CPC ................ *G01C 23/00* (2013.01); *B64D 43/00* (2013.01)

(58) Field of Classification Search
CPC ........... G09G 5/00; G09G 5/10; G01C 23/00; G08B 21/00
USPC ............ 340/971, 945; 345/690, 1.3; 701/301; 73/304 C
See application file for complete search history.

(56) References Cited

U.S. PATENT DOCUMENTS

| 6,285,360 | B1 |   | 9/2001  | Li |             |
|-----------|----|---|---------|------------------|---------|
| 6,803,860 | B1 | * | 10/2004 | Langner et al. | 340/971 |
| 6,977,666 | B1 | * | 12/2005 | Hedrick | 345/690 |
| 6,985,801 | B1 |   | 1/2006  | Straub et al. |         |
| 7,482,950 | B2 | * | 1/2009  | Stoner et al. | 340/945 |
| 7,728,788 | B1 | * | 6/2010  | Echols et al. | 345/1.3 |
| 2003/0058136 | A1 |   | 3/2003  | Hedrick |         |
| 2004/0162648 | A1 | * | 8/2004  | Bontrager et al. | 701/3 |
| 2006/0074559 | A1 | * | 4/2006  | Meunier | 701/301 |

(Continued)

FOREIGN PATENT DOCUMENTS

DE    19716941    10/1998
JP    H05221319 A    8/1993

OTHER PUBLICATIONS

Three Large LCD cockpit concept for retrofit aplications by A.J.C. de Reus et al., Feb. 2005.*

(Continued)

*Primary Examiner* — Steven Lim
*Assistant Examiner* — Kaleria Knox
(74) *Attorney, Agent, or Firm* — General Electric Company; William S. Munnerlyn

(57) ABSTRACT

An aircraft cockpit display arrangement having a primary instrument display region for positioning in front of at least one pilot. The primary instrument display region has a wide screen format panel display and duplicated redundant display drive electronics configured to present both primary flight information and navigational display information on the same screen.

6 Claims, 6 Drawing Sheets

(56) References Cited

U.S. PATENT DOCUMENTS

2006/0164260 A1* 7/2006 Berthou et al. ............... 340/945
2008/0012730 A1* 1/2008 Soler ............................. 340/973

OTHER PUBLICATIONS

De Reus, A.J.C., et al. Three Large LCD Cockpit Concept for Retrofit Applications, paper, Oct. 24-28, 2004, pp. 1-18; 23rd Digital Avionics System Conference, Salt Lake City, Utah, U.S.A.

CN 200880010984.4, English Translation of Chinese Office Action, Jan. 31, 2011.

Antoine De Reus and Nico De Gelder, "Three Large LCD cockpit concept for retrofit applications" National Aerospace Laboratory NLR, Anthony Fokkerweg 2, 1059 CM Amsterdam, The Netherlands Lilian Lacoste, Thales Avionics, Rue Toussaint Catros, 33166 St. Medard-en-Jalles, France, IEEE 2004.

Unofficial English translation of JP Notice of Allowance dated Jan. 8, 2014, issued in connection with corresponding JP Application No. 2010-501577.

* cited by examiner

AIRCRAFT DISPLAYS AND DISPLAY ARRANGEMENTS

CROSS-REFERENCE TO RELATED APPLICATIONS

This is a national stage application under 35 U.S.C. §371 (c) of prior-filed, co-pending PCT patent application serial number PCT/GB2008/001070, filed on Mar. 27, 2008, which claims priority to Great Britain patent application serial number GB0706210.2, filed on Mar. 30, 2007, each of which is hereby incorporated by reference in its entirety.

STATEMENT REGARDING FEDERALLY SPONSORED RESEARCH OR DEVELOPMENT

Not Applicable

NAMES OF PARTIES TO A JOINT RESEARCH AGREEMENT

Not Applicable

REFERENCE TO A SEQUENCE LISTING, A TABLE, OR COMPUTER PROGRAM LISTING APPENDIX SUBMITTED ON COMPACT DISC

Not Applicable

BACKGROUND OF THE INVENTION

1. Field of the Invention

The field of the invention relates to aircraft displays and display arrangements.

2. Description of Related Art

Commercial aircraft cockpit display arrangements usually include two panels of identical primary instruments located in front of the captain and first officer respectively. As far as possible, the arrangement of the instruments on both panels is the same although some instruments may need to be positioned differently according to the shape of the panel. A central panel contains an array of secondary instruments that can be viewed by both the captain and first officer. In most aircraft, the primary instruments are provided by a number of discrete, separate instruments, which may have dial and moving pointer displays or may be electronic displays, such as provided by CRT displays, matrix array LCD displays or the like. The trend is for electromechanical displays to be replaced by electronic displays on which a number of different functions are represented.

Aircraft cockpit display arrangements are known employing two separate 4:3 display panels in front of each pilot. Each display panel is dedicated to displaying different sets of information. One panel may display aircraft attitude, height, speed and direction information and the other panel may display navigation information or a radar weather image. In event of a failure of one or other of these panels, it is possible to switch the remaining panel to display the information previously displayed on the failed panel, if this is information is more flight-critical. This provides a certain degree of redundancy but has the disadvantage that not all of the information can any longer be presented to the pilot. Although the arrangement provides for the more important information to be displayed, the loss of any information is a severe disadvantage.

What is needed is an improved aircraft display and display arrangement.

BRIEF SUMMARY OF THE INVENTION

According to one aspect of the present invention there is provided an aircraft cockpit display arrangement including a primary instrument display region positioned in front of each pilot, the primary instrument display region including a single wide screen format panel display and duplicated redundant display drive electronics arranged to present both primary flight information and navigational display information on the same screen.

According to another aspect of the present invention there is provided an aircraft cockpit display instrument unit including a housing containing duplicated display driver electronics and a display screen panel mounted on one face of the housing, the screen having a wide screen format arranged to be oriented horizontally and the display driver electronics being arranged to present primary flight information in one region of the screen and navigational information in another region of the screen.

According to a further aspect of the present invention there is provided a method of retrofitting a flat panel display screen in an aircraft including the steps of removing an existing panel with attached instrumentation, disconnecting wiring extending to the instrumentation by uncoupling connectors on the wiring from connectors on the instruments, replacing the existing panel with a new panel arranged to support a wide screen panel display unit and reconnecting some at least of the connectors on the wiring to mating connectors associated with the flat panel display unit.

BRIEF DESCRIPTION OF THE SEVERAL VIEWS OF THE DRAWINGS

An aircraft display and display arrangement will now be described, by way of example, with reference to the accompanying drawings, in which.

DETAILED DESCRIPTION OF THE INVENTION

Figure 1:
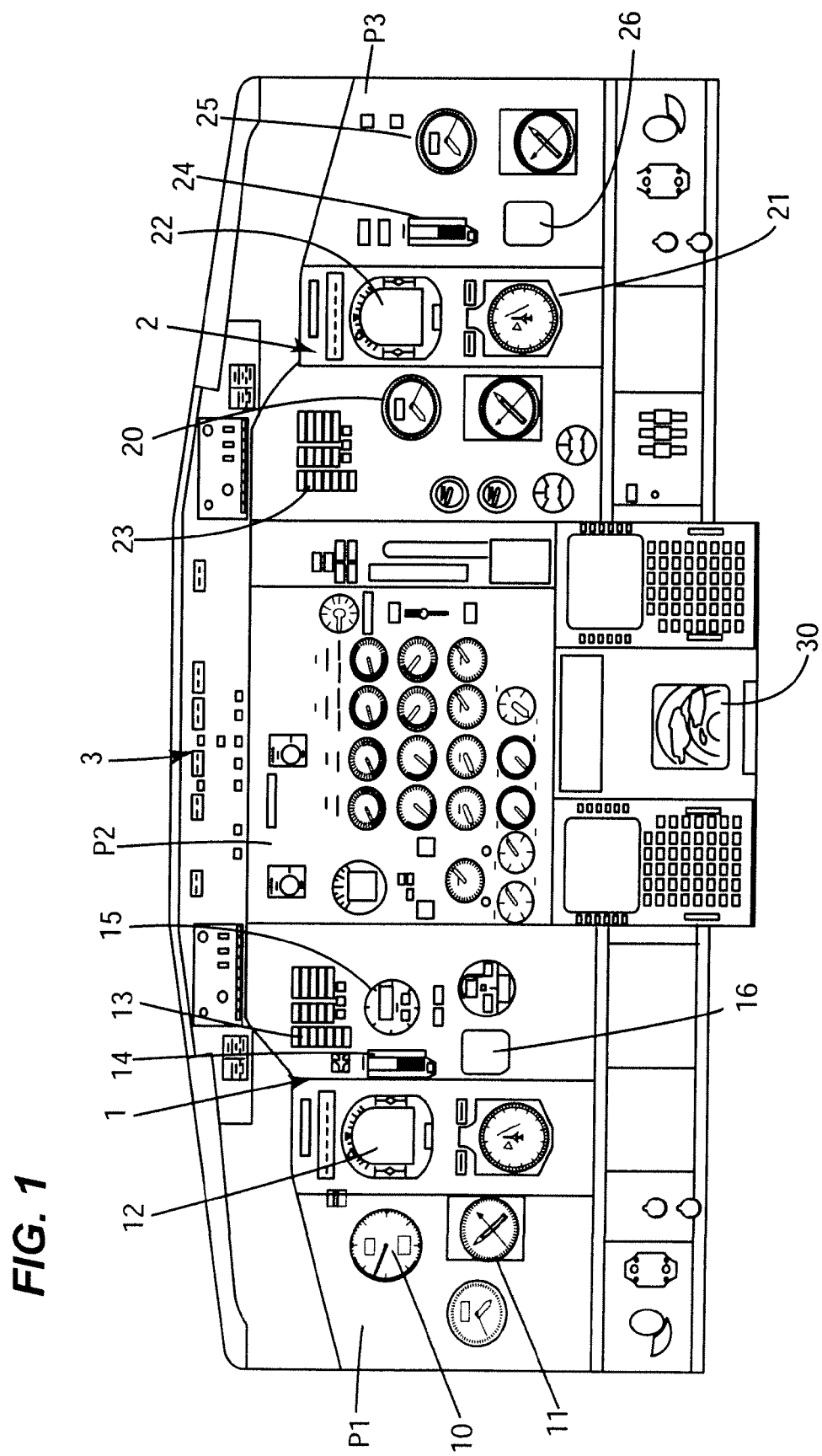
FIG. 1 is an elevation view of a typical, conventional commercial aircraft cockpit instrumentation layout.

The cockpit instrumentation display layout shown in FIG. 1 is for a Boeing 737-300/500 aircraft. The display layout comprises three main regions. The left-hand region 1, on panel P1, is located in front of the captain and comprises the primary instruments. The right-hand region 2, on panel P3, is located in front of the first officer and comprises substantially the same primary instruments as in the left-hand region 1 laid out as far as possible in the same configuration. The central region 3, on panel P2, between the left and right regions 1 and 2 comprises a single set of secondary instruments positioned where they can be seen by both pilots. The various instruments labeled 10 to 16 in the left-hand region 1 and their equivalent instruments 20 to 26 in the right-hand region 2 are all provided by separate, discrete units each comprising a housing with a front display panel. Connection to each of these instruments is made by separate connectors.

Figure 2:
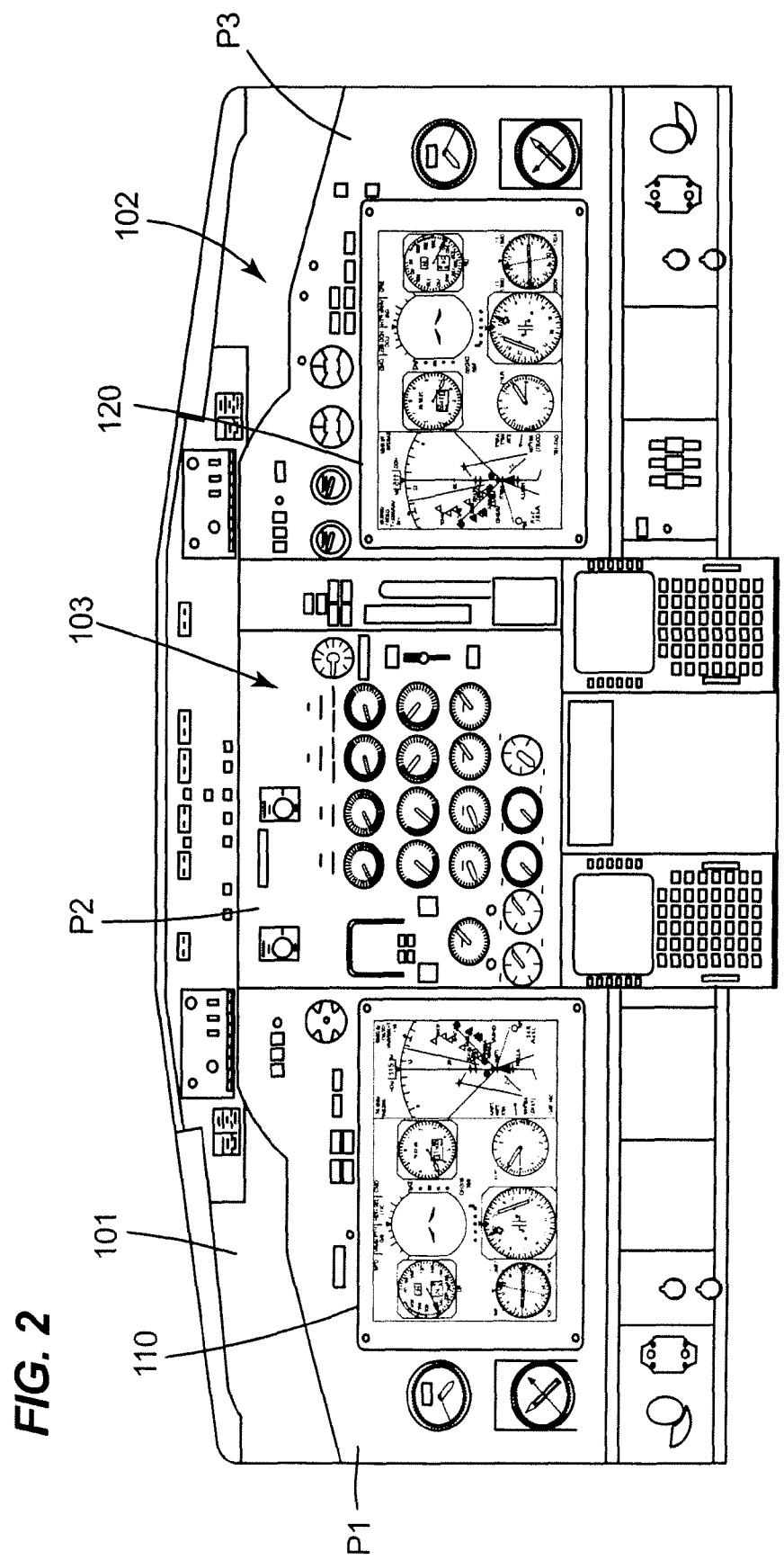
FIG. 2 is an elevation view of an instrumentation layout including a display arrangement according to the present invention.
Figure 3:
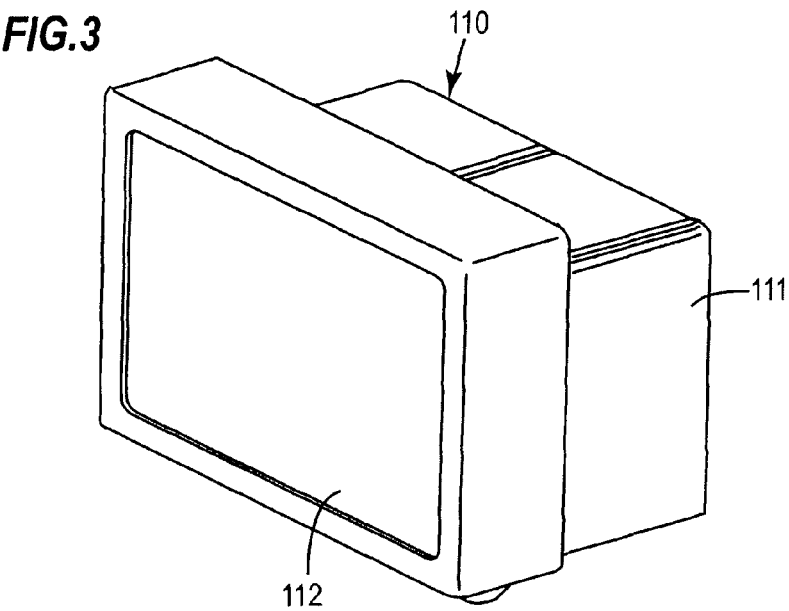
FIG. 3 is a perspective view of the display unit.
Figure 4:
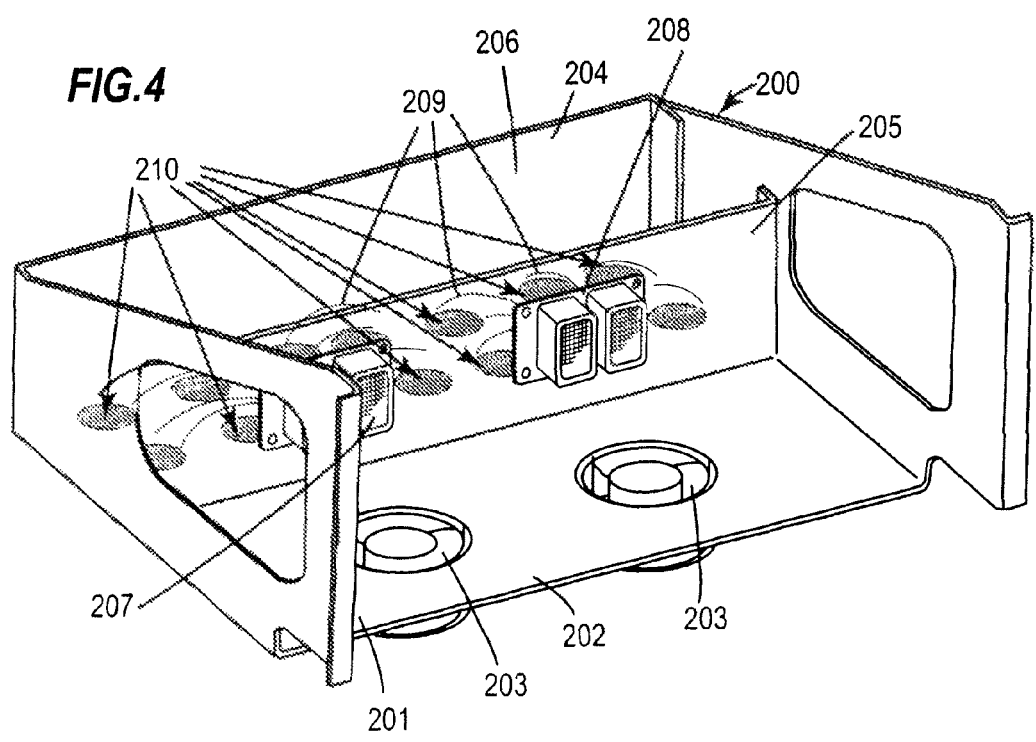
FIG. 4 is a perspective view of a mounting tray for the display unit.

Referring now to FIG. 2, there is shown a display layout according to the present invention. The central region 103 is substantially identical to the central region 3 in FIG. 1 except that the weather display radar 30 of FIG. 1 has been incorporated into the primary instrumentation. In the left-hand region 101, the instruments 10 to 17 of the previous region have been all replaced by a single integrated display unit 110 and the equivalent instruments 20 to 27 in the right-hand region 2 have been replaced by a second display unit 120 in the region 102. The two display units 110 and 120 are both identical as far as their hardware is concerned so only the left-hand unit 110 will be described in detail. As can be seen from FIG. 3, the unit 110 has a rectangular housing 111 on the front face of which is supported a flat AMLCD display panel 112 on which the display representation is provided. The unit 110 is supported in the cockpit by means of a mounting tray 200, as shown in FIG. 4.

The tray 200 is fabricated from pressed steel and comprises an open front 201 with a flat floor 202 supporting two cooling fans 203 arranged to direct cooling air upwardly onto the underside of the display unit 110. A rear wall 204 and intermediate wall 205 extend across the tray 200 arranged vertically, with the intermediate wall spaced forwardly of the rear wall to form a rear, wiring compartment 206. The intermediate wall 205 supports two ARINC-style connectors 207 and 208 adapted to make a push-fit connection with mating connectors (not shown) on the rear face of the housing 111 of the display unit 110. The two connectors 207 and 208 on the intermediate wall 205 connect at the rear side of the wall with one end of wiring bundles 209 extending within the rear wiring compartment 206. The wiring bundles 209 connect at their other end with an array of fifteen connectors 210 mounted in the floor 202 in the compartment 206. The floor-mounted connectors 210 are accessible on the underside of the floor 202 and are arranged to mate with connectors at the end of cables previously connected to the discrete instruments 10 to 17 and 20 to 27.

Figure 5:
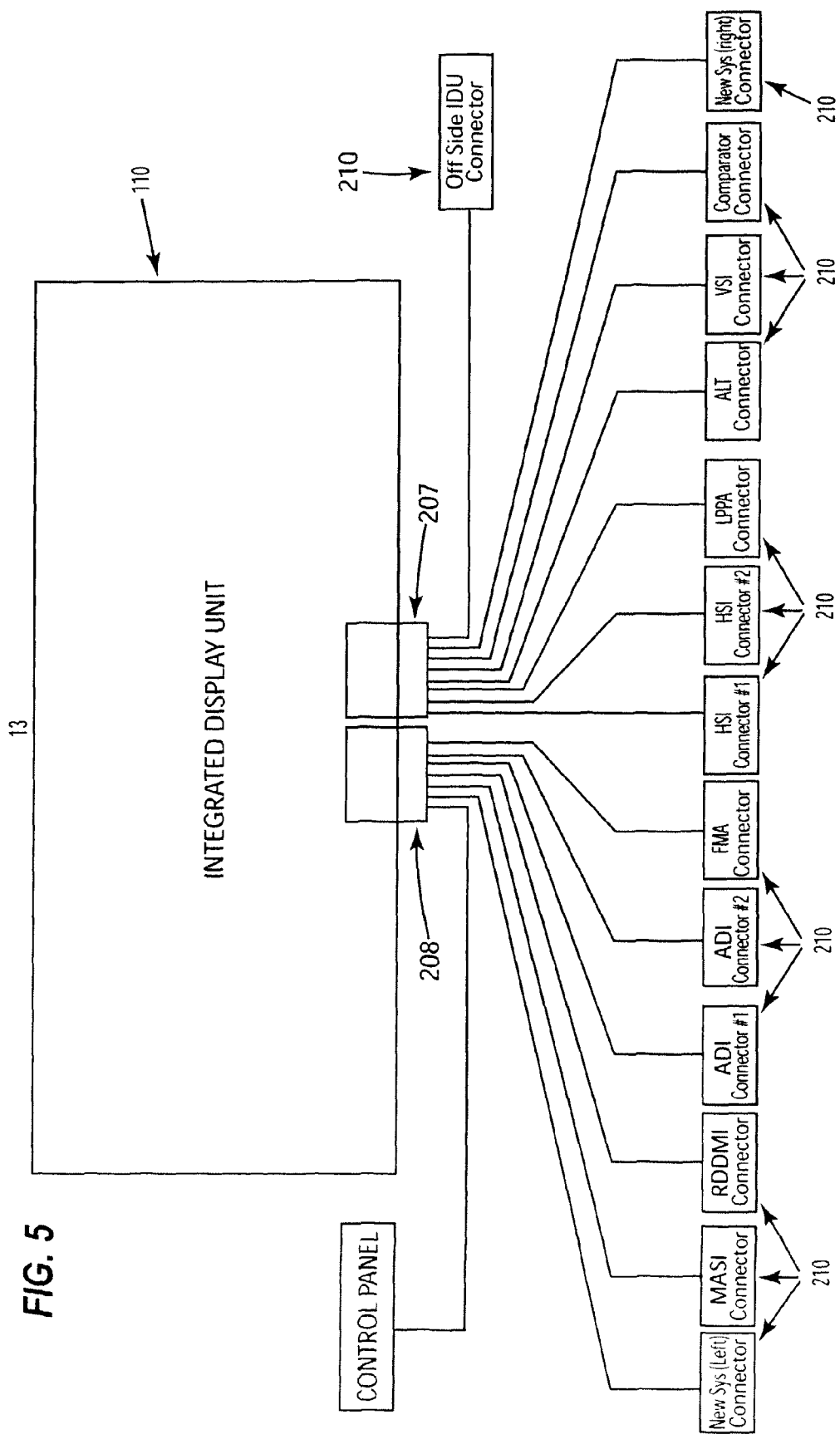
FIG. 5 illustrates schematically the connection arrangement of the display unit.

FIG. 5 shows the connection arrangement to the display unit 110 and illustrates the various connectors 210 with which the unit interconnects via the connectors 207 and 208.

Figure 6:
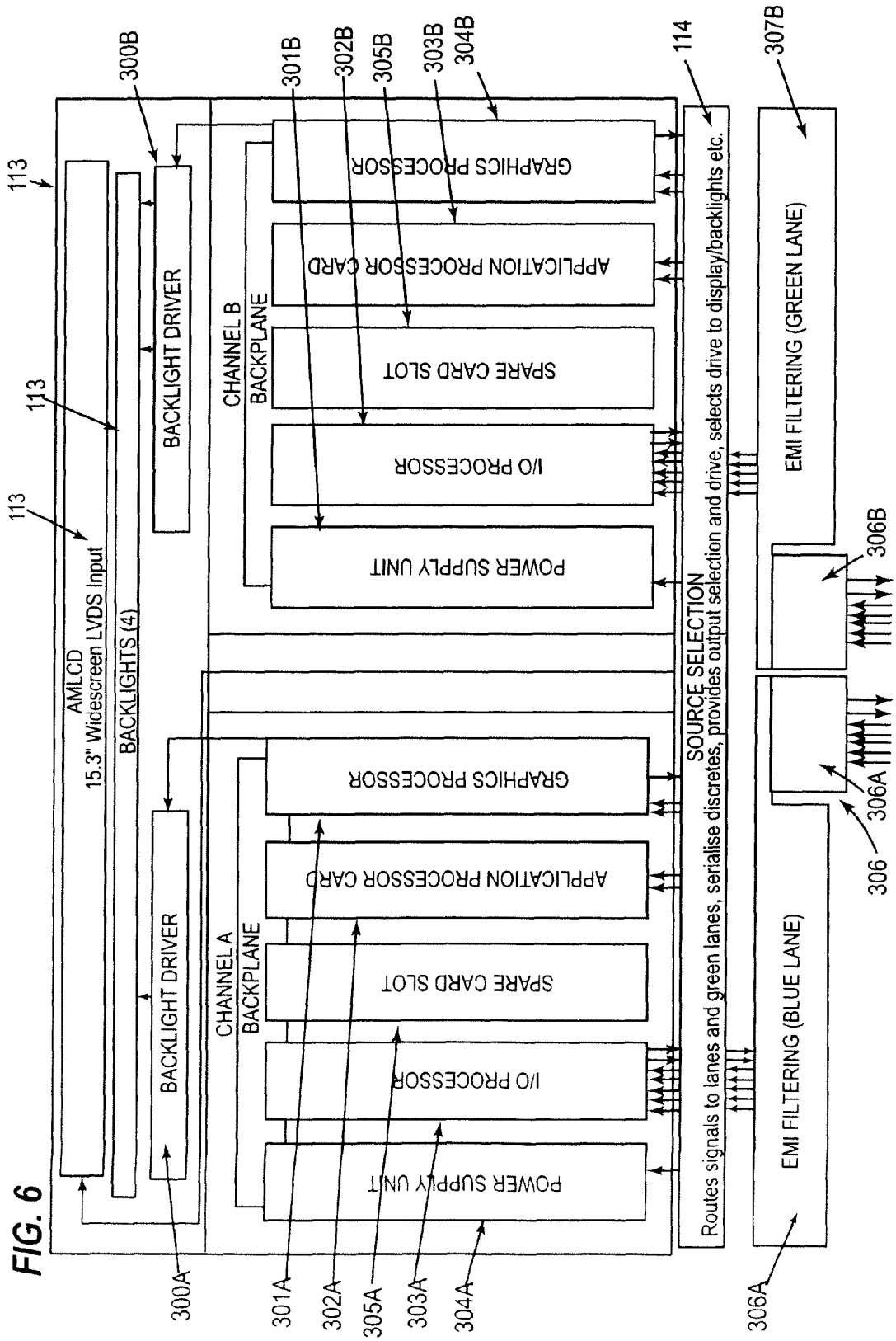
FIG. 6 shows schematically the electronics arrangement within the display unit.

FIG. 6 shows the interior of the display unit 110 schematically. The display panel or screen 112 is provided by a flat panel AMLCD screen with a horizontal dimension of 13.2 inches (335 mm), a vertical dimension of 7.9 inches (201 mm), that is, an aspect ratio of 16:9 and a diagonal dimension of 15.3 inches (389 mm). This display gives 25% more available screen space than a conventional 4:3 aspect ratio display used in aircraft having a diagonal dimension of 13.1 inches (333 mm). It will be appreciated that different size screens could be used and that the aspect ratio could be changed slightly from the wide screen format mentioned above. For example, a 17 inch (432 mm) widescreen or 6×8 portrait (152 mm×203 mm) formats could be used. Immediately behind the display screen 112 is mounted a backlight assembly 113 made up of four conventional light sources such as cold cathode lamps. Various filters could be provided between the screen 112 and the backlight 113, or in front of the screen, in the usual way. The backlight 113 is powered by one or other of two separate backlight driver units 300A and 300B. The display unit 110 has two separate 10 channels A and B each of which contains all the necessary inputs, outputs and processing capabilities to generate a complete primary flight display instrumentation and navigation display formats. Each channel A and B includes a power supply unit 301, an input/output processor 302, an application processor card 303, a graphics processor 304 and a spare card slot 305. The graphics processor 304 in each channel A and B is connected to a respective one of the backlight drivers 300A and 300B. Electrical connection to the display unit 110 is made by two connector assemblies 306 (only one of which is shown in FIG. 6) mounted on the rear of the housing 110 and adapted to mate with the connector assemblies 207 and 208 on the mounting tray 200. The connector assembly 306 is divided into two separate connectors 306A and 306B both of which receive identical duplicated inputs and provide identical outputs. Both connectors 306A and 306B connect to a source selection unit 114 via respective EMI filtering units 307A and 307B. The connectors 306A and 306B are mounted directly on two respective EMI filter boards and each board is mounted within its own screened enclosure to minimize both emissions to and from the display unit 110. The two boards are separate so that a single point failure, such as the connector mating half working loose, will not cause total loss of the display but will only cause the loss of the signals using that connector half. The source selection unit 114 is operable to route signals to appropriate lanes. It also converts discrete signals to serial (RS485) form, this function being duplicated so that a single failure would not cause the total loss of all discrete data. The source selection unit 114, furthermore, selects the drive to the screen 112 and consolidates power to the screen. The source selection unit 114 also selects discrete and ARINC outputs so that the signals are driven from the active channel A or B.

In normal operation, the screen 112 is driven by signals from one of the channels A or B, with the other channel B or A in a stand-by mode. If there is a failure in the driving channel, the other channel can be quickly selected to drive the screen 112 in place of the failed channel. The replacement channel has all the functions of the failed channel so there is no change in the display representation and no information is lost to the pilot. Switching between the two channels A and B may be carried out manually, such as by the pilot changing a switch setting if he detects a problem with the display. Alternatively, the switching could be carried out automatically in response to fault detection processing built into the unit 110.

Figure 7:
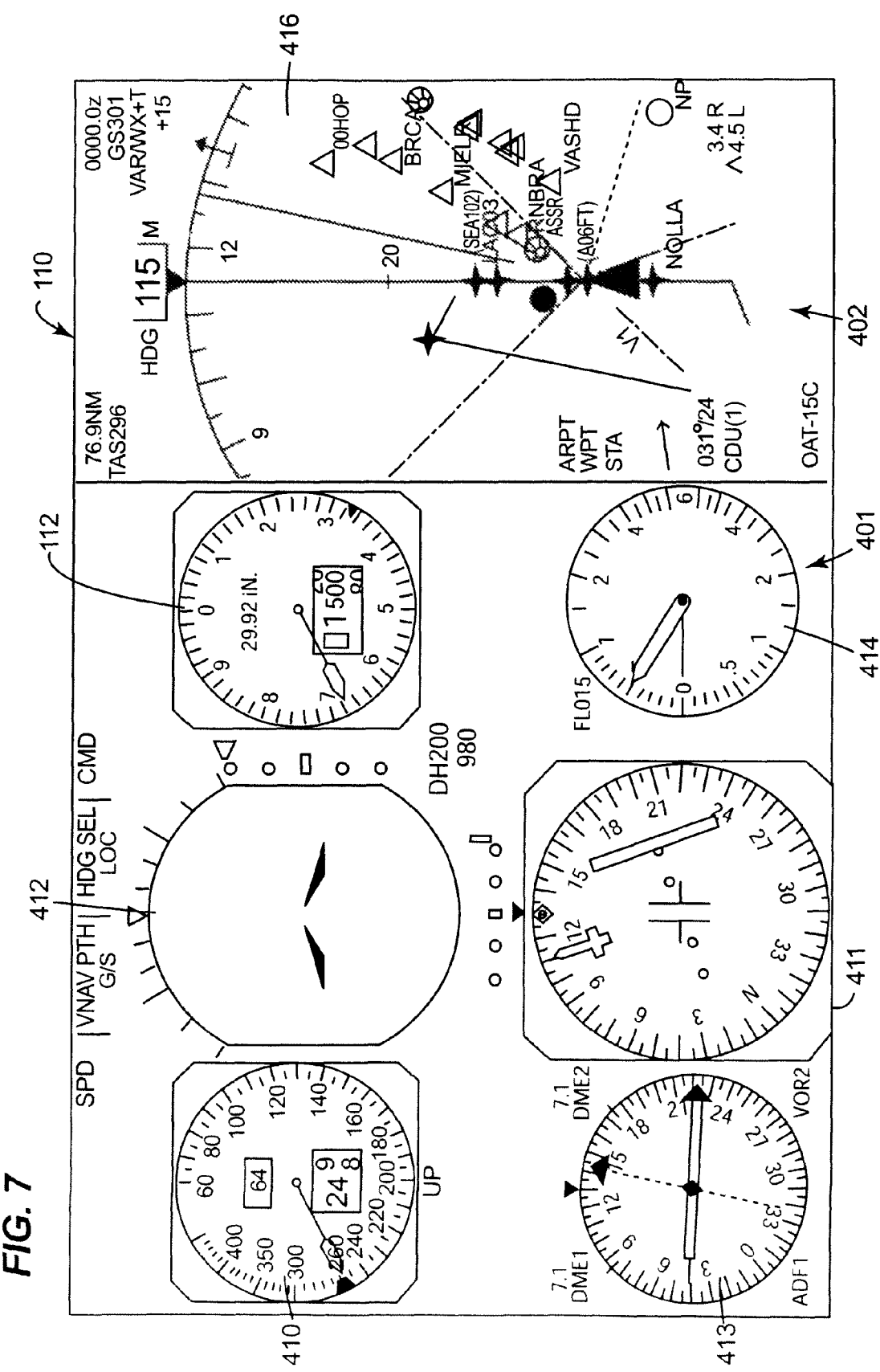
FIG. 7 shows a typical display format.

As shown in FIG. 7, each display unit 110 and 120 is energized to provide a display format in which the screen 112 is divided across its width into two regions 401 and 402. In the left-hand display unit 110, the left-hand region 401 is larger, of a square shape and shows representations of six primary flight display instruments 410 to 415, each of circular shape. These representations 410 to 415 are selected to resemble conventional electromechanical instrument dials. The right-hand display region 402 is rectangular with its longer sides oriented vertically. In this region, the display unit 110 represents a navigational map image 414. The right-hand display unit 120 shows the same display representation except that the positions of the map and primary instrument regions are reversed. It will be appreciated that the display formats could be different from that described, for example, the map could be replaced by other navigational information such as a radio navigation aid display (VOR) or the like.

By providing a single wide screen display and duplicated processing and drive functions, the display unit of the present invention ensures that, even when there is a display failure, the pilot is still provided with all the information normally provided. Although the screen 112 itself is not duplicated, this is relatively immune to failure compared with the associated processing. Furthermore, when a fault does develop in a screen it usually only leads to localized degradation, such as missing lines or columns.

The wide screen format enables conventional display layouts on various aircraft to be mimicked, with two formats per display. This reduces the amount of crew retraining needed to use the display of the present invention. The display unit of the present invention can be readily retrofitted into many commercial aircraft having a cockpit display arrangement of the kind shown in FIG. 1. This is done by removing the existing P1 and P3 panels and the associated instruments. The instruments are unplugged from the cable end connectors and these are retained. Two new mounting trays 200 for the display units 110 and 120 are then installed and connected to the cable end connectors for those instruments to be replaced by the display unit. New panels are then replaced over the trays 200 and the display units 110 and 120 can be plugged into the mounting trays and retained in position in any conventional manner. Some existing instrumentation, such as the clock and hydraulic gauges may need to be relocated to other positions on the panels. By making use of existing interconnections the retrofit turn around time can be kept to a minimum.

I claim:

1. An aircraft cockpit display arrangement, comprising:
   first and second primary instrument display regions for positioning in front of respective pilots, the first and second primary instrument display regions each comprising:
   wide screen format panel display coupled to redundant first and second display drive electronics configured to identically present both primary flight information, and navigational display information, and couple to weather radar and display weather information derived from the weather radar on the wide screen format panel display;
   first and second display drive electronics configured to display the same information at the same locations on the wide screen display; and
   source selection unit operable to drive the wide screen format panel display from the first display drive electronics and maintain the second display drive electronics in stand-by mode, wherein the source selection unit is further operable to detect display fault and activate the second display drive electronics to drive the wide screen format panel display.

2. The aircraft cockpit display arrangement of claim 1, wherein the source selection unit is a source selection electronics unit.

3. The aircraft cockpit display arrangement of claim 1, wherein the wide screen format panel display is driven by the first display drive electronics in normal operation, and wherein the second display drive electronics is selected to drive the wide screen format panel display and provide all the information normally provided when there is a failure in the first display drive electronics.

4. An aircraft cockpit display instrument unit, comprising:
   a housing containing a first display drive electronics and a second display drive electronics, the first and second display drive electronics being identical and redundant display drive electronics configured to display the same information at the same locations on the wide screen display; and
   a display screen panel mounted on one face of the housing, the display screen panel having a wide screen format arranged to be oriented horizontally and the first and second display drive electronics each being arranged to present undifferentiated primary flight information in one region of the display screen panel, navigation information and weather information in another region of the display screen panel.

5. The aircraft cockpit display instrument unit of claim 4, wherein the wide screen format panel display is driven by the first display drive electronics in normal operation, and wherein the second display drive electronics is selected to drive the wide screen format panel display and provide all the information normally provided when there is a failure in the first display drive electronics.

6. A method of retrofitting a flat panel display screen in an aircraft, the method comprising:
   removing an existing panel display with the attached instrumentation;
   disconnecting wiring extending to the instrumentation by uncoupling connectors on the wiring from connectors on the instruments;
   replacing the existing panel display with a wide screen format panel display and first and second identical redundant display drive electronics, each of the first and second display drive electronics being configured to present the same both primary flight information, navigational display information, and weather information on the wide screen format panel display,
   wherein the first and second display drive electronics display the same information at the same locations on the wide screen display.

* * * * *

UNITED STATES PATENT AND TRADEMARK OFFICE
CERTIFICATE OF CORRECTION

Page 1 of 1

PATENT NO. : 9,175,978 B2
APPLICATION NO. : 12/593951
DATED : November 3, 2015
INVENTOR(S) : Hall It is certified that error appears in the above-identified patent and that said Letters Patent is hereby corrected as shown below:

IN THE DRAWINGS

In Fig. 6, Sheet 5 of 6, for Tag "301A", in Line 1, delete "GRAPHICS PROCESSOR" and insert -- POWER SUPPLY UNIT --, therefor.

In Fig. 6, Sheet 5 of 6, for Tag "302A", in Line 1, delete "APPLICATION PROCESSOR CARD" and insert -- I/O PROCESSOR --, therefor.

In Fig. 6, Sheet 5 of 6, for Tag "303A", in Line 1, delete "I/O PROCESSOR" and insert -- APPLICATION PROCESSOR CARD --, therefor.

In Fig. 6, Sheet 5 of 6, for Tag "304A", in Line 1, delete "POWER SUPPLY UNIT" and insert -- GRAPHICS PROCESSOR --, therefor.

In Fig. 6, Sheet 5 of 6, delete " 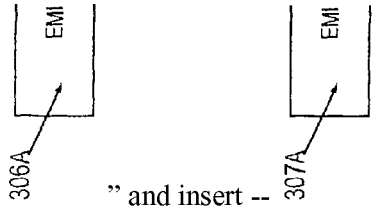 ", therefor.

IN THE SPECIFICATION

In Column 4, Line 6, delete "housing 110" and insert -- housing 111 --, therefor.

Signed and Sealed this
Twenty-ninth Day of March, 2016

Michelle K. Lee
*Director of the United States Patent and Trademark Office*